United States Patent
Zorovich et al.

(10) Patent No.: US 9,272,444 B2
(45) Date of Patent: Mar. 1, 2016

(54) ICE MOLD

(71) Applicant: PROPELLER, INC., Hoboken, NJ (US)

(72) Inventors: Kenneth D. Zorovich, Hoboken, NJ (US); John C. Earle, Annapolis, MD (US); Yos Kumthampinij, Edgewater, NJ (US); William Nickley, Jersey City, NJ (US)

(73) Assignee: Propeller, Inc., Hoboken, NJ (US)

( * ) Notice: Subject to any disclaimer, the term of this patent is extended or adjusted under 35 U.S.C. 154(b) by 0 days.

(21) Appl. No.: 14/334,109

(22) Filed: Jul. 17, 2014

(65) Prior Publication Data

US 2015/0021458 A1 Jan. 22, 2015

Related U.S. Application Data

(60) Provisional application No. 61/847,731, filed on Jul. 18, 2013.

(51) Int. Cl.
*B29C 33/50* (2006.01)
*B29C 33/40* (2006.01)
(Continued)

(52) U.S. Cl.
CPC ............. *B29C 33/50* (2013.01); *B29C 33/0038* (2013.01); *B29C 33/202* (2013.01); *B29C 33/405* (2013.01); *F25C 1/22* (2013.01); *B29K 2883/005* (2013.01); *F25C 1/243* (2013.01)

(58) Field of Classification Search
CPC .. B29C 33/50; B29C 33/405; B29C 33/0038; B29C 33/202; B29K 2883/005; F25C 1/22; F25C 1/243

USPC .................................................. 249/134, 164
See application file for complete search history.

(56) References Cited

U.S. PATENT DOCUMENTS 1,034,580 A * 8/1912 Buckau ......................... 425/408
1,505,592 A   8/1924 Epperson
(Continued)

FOREIGN PATENT DOCUMENTS

CN    2207553 Y    9/1995
CN    2742771 Y    11/2005
(Continued)

OTHER PUBLICATIONS

Tovolo Square Ice Cube Maker, Apr. 29, 2013, www.ebay.com/itm/ws/eBayISAPI.dll?ViewItem&item=281077696792, 4 pages.*
(Continued)

*Primary Examiner* — Yogendra Gupta
*Assistant Examiner* — Emmanuel S Luk
(74) *Attorney, Agent, or Firm* — Greenberg Traurig, LLP

(57) ABSTRACT

An ice mold includes a first mold assembly and a second mold assembly, each including a base with an aperture and a mold attached to the base. Each of the molds includes a receptacle that forms a cavity. The first mold assembly is attached removably to the second mold assembly such that a liquid-tight seal is formed between the molds. When the first mold assembly and the second mold assembly are attached to one another, the cavities of the molds form a molding cavity. When the first mold assembly and the second mold assembly are detached from one another, each of the receptacles is moveable from a first molding position, in which the receptacle is positioned within the respective aperture of the base, and a second inverted position, in which at least a portion of the receptacle of extends outwardly from the aperture.

23 Claims, 6 Drawing Sheets

(51) Int. Cl.
*B29C 33/20* (2006.01)
*B29C 33/00* (2006.01)
*F25C 1/22* (2006.01)
*F25C 1/24* (2006.01)

(56) References Cited

U.S. PATENT DOCUMENTS

| | | | |
|---|---|---|---|
| 1,698,332 A | 1/1929 | Henning | |
| 1,987,945 A | 1/1935 | Schnaier | |
| 2,152,467 A * | 3/1939 | Crosby | 62/530 |
| 2,247,018 A * | 6/1941 | Henning | 249/119 |
| 2,282,544 A | 5/1942 | Rosberg | |
| 2,285,149 A | 6/1942 | D'Arcey | |
| 2,288,044 A | 6/1942 | Stemme | |
| 2,317,067 A | 4/1943 | Knaust | |
| 2,460,765 A | 2/1949 | Palaith | |
| 2,498,645 A | 2/1950 | Bobby | |
| 2,591,261 A | 4/1952 | Holahan | |
| 2,775,099 A | 12/1956 | Brown | |
| 2,782,608 A | 2/1957 | French et al. | |
| D185,302 S | 5/1959 | Mitzenmacher | |
| 2,946,207 A | 7/1960 | Hulterstrum | |
| D188,992 S | 10/1960 | Morrison | |
| 2,955,044 A * | 10/1960 | Tupper | 426/515 |
| 2,980,039 A | 4/1961 | Jolly | |
| D192,225 S | 2/1962 | Coleman | |
| 3,020,730 A | 2/1962 | Harris, Sr. | |
| 3,091,194 A | 5/1963 | Dickinson | |
| 3,161,031 A | 12/1964 | Flannery | |
| 3,261,178 A | 7/1966 | Okada | |
| 3,287,807 A * | 11/1966 | Menke | 425/84 |
| 3,306,512 A | 2/1967 | Pagnini | |
| 3,411,463 A | 11/1968 | Moseres | |
| 3,483,712 A | 12/1969 | Gram | |
| 3,533,246 A | 10/1970 | Hawley | |
| 3,535,889 A | 10/1970 | Curti | |
| 3,640,081 A * | 2/1972 | Hadden | 62/1 |
| 3,695,895 A | 10/1972 | Brown | |
| 3,736,767 A | 6/1973 | Lukes | |
| 3,748,778 A | 7/1973 | Ellies et al. | |
| 3,770,460 A | 11/1973 | Vroman | |
| 3,780,536 A | 12/1973 | Fishman et al. | |
| 4,076,207 A * | 2/1978 | Austin | 249/66.1 |
| D249,079 S | 8/1978 | Soderman et al. | |
| 4,104,411 A | 8/1978 | Pooler | |
| 4,157,805 A * | 6/1979 | Haber et al. | 249/91 |
| 4,226,355 A | 10/1980 | Helfrich, Jr. | |
| 4,239,175 A | 12/1980 | Straubinger | |
| 4,320,849 A * | 3/1982 | Yellin | 220/252 |
| 4,330,245 A | 5/1982 | Billett et al. | |
| 4,352,830 A | 10/1982 | Billett et al. | |
| D269,578 S | 7/1983 | Straubinger | |
| 4,392,803 A | 7/1983 | Cross et al. | |
| 4,550,575 A | 11/1985 | DeGaynor | |
| 4,638,645 A | 1/1987 | Simila | |
| 4,688,398 A | 8/1987 | Baek | |
| 4,696,166 A | 9/1987 | Bukoschek et al. | |
| 4,797,295 A | 1/1989 | Franco et al. | |
| 4,815,287 A | 3/1989 | O'Daniel | |
| D305,193 S | 12/1989 | Sajadieh | |
| D311,330 S | 10/1990 | Hamamura | |
| 4,986,080 A | 1/1991 | Grigoli et al. | |
| 5,177,981 A | 1/1993 | Haas | |
| 5,354,191 A | 10/1994 | Bobis | |
| 5,516,540 A | 5/1996 | Cathenaut | |
| 5,568,729 A | 10/1996 | Heinrich et al. | |
| D390,335 S | 2/1998 | Carrick et al. | |
| 5,720,175 A | 2/1998 | White et al. | |
| 5,939,983 A | 8/1999 | Rudell et al. | |
| 5,946,773 A | 9/1999 | Esker et al. | |
| 6,109,056 A | 8/2000 | Feldpausch | |
| 6,190,226 B1 | 2/2001 | Conconi | |
| RE37,213 E | 6/2001 | Staggs | |
| 6,301,919 B1 | 10/2001 | Blaustein et al. | |
| D454,751 S | 3/2002 | Zank | |
| D457,389 S | 5/2002 | Snell | |
| D457,782 S | 5/2002 | Snell | |
| 6,399,126 B1 | 6/2002 | Weldon, Jr. | |
| 6,425,438 B1 | 7/2002 | Hahn | |
| 6,481,239 B2 | 11/2002 | Hodosh et al. | |
| 6,540,200 B2 | 4/2003 | Afolabi | |
| 6,631,616 B2 | 10/2003 | Wisniewski et al. | |
| 6,745,595 B1 | 6/2004 | Kateman et al. | |
| D504,286 S * | 4/2005 | de Cleir | D7/675 |
| D506,640 S | 6/2005 | Marck et al. | |
| D540,006 S | 4/2007 | Green et al. | |
| D550,509 S | 9/2007 | Dretzka | |
| D557,073 S | 12/2007 | Snell | |
| 7,520,140 B2 | 4/2009 | DeLucia | |
| D594,626 S | 6/2009 | Reed | |
| D613,132 S | 4/2010 | Frank | |
| D623,898 S | 9/2010 | Snell | |
| D626,307 S | 11/2010 | Zorovich et al. | |
| D626,384 S | 11/2010 | Zorovich et al. | |
| D630,407 S | 1/2011 | Zorovich et al. | |
| D634,988 S | 3/2011 | Zorovich et al. | |
| D637,035 S | 5/2011 | Zorovich et al. | |
| D640,120 S | 6/2011 | Zorovich et al. | |
| 7,955,066 B2 | 6/2011 | Takeuchi | |
| D642,022 S | 7/2011 | Zorovich et al. | |
| D655,147 S | 3/2012 | Zorovich et al. | |
| D658,456 S | 5/2012 | Zorovich et al. | |
| D658,948 S | 5/2012 | Zorovich et al. | |
| D661,540 S * | 6/2012 | Facey | D7/354 |
| 8,430,658 B2 | 4/2013 | Zorovich et al. | |
| D687,681 S * | 8/2013 | Barber | D7/674 |
| D689,746 S | 9/2013 | Zorovich et al. | |
| D689,747 S | 9/2013 | Zorovich et al. | |
| D690,169 S | 9/2013 | Zorovich et al. | |
| D731,264 S * | 6/2015 | Frank et al. | D7/672 |
| 2003/0126712 A1 | 7/2003 | Kosick | |
| 2004/0076727 A1 | 4/2004 | L'Hommedieu | |
| 2005/0072321 A1 | 4/2005 | Larsen | |
| 2005/0151049 A1 * | 7/2005 | Lion et al. | 249/121 |
| 2005/0202138 A1 | 9/2005 | Kazich | |
| 2007/0275126 A1 | 11/2007 | Chan | |
| 2008/0020120 A1 | 1/2008 | O'Donnell Kiely | |
| 2008/0241334 A1 | 10/2008 | Liberman | |
| 2009/0088273 A1 * | 4/2009 | Nardacci et al. | 473/379 |
| 2009/0178430 A1 | 7/2009 | Jendrusch et al. | |
| 2010/0183789 A1 | 7/2010 | Zorovich et al. | |
| 2012/0237656 A1 * | 9/2012 | Henry | 426/512 |
| 2013/0011530 A1 | 1/2013 | Wolf et al. | |
| 2014/0137576 A1 * | 5/2014 | Culley et al. | 62/71 |
| 2014/0165610 A1 * | 6/2014 | Boarman et al. | 62/3.63 |
| 2014/0165618 A1 * | 6/2014 | Culley et al. | 62/71 |
| 2014/0165619 A1 * | 6/2014 | Culley | 62/71 |
| 2014/0165620 A1 * | 6/2014 | Culley | 62/71 |
| 2015/0107275 A1 * | 4/2015 | Papalia | 62/67 |

FOREIGN PATENT DOCUMENTS

| | | |
|---|---|---|
| EP | 0417413 | 5/1994 |
| EP | 1391173 | 2/2004 |
| EP | 2327313 | 6/2011 |
| EP | 2549207 A2 | 1/2013 |
| EP | 2578969 A2 | 4/2013 |
| GB | 0698414 | 10/1953 |
| JP | 57155953 A | 9/1982 |
| JP | 06343396 A | 12/1994 |
| JP | 2003116467 | 4/2003 |
| WO | 8704781 | 8/1987 |
| WO | 9922603 | 5/1999 |
| WO | 2010083045 | 7/2010 |
| WO | 2014113523 A1 | 7/2014 |

OTHER PUBLICATIONS

III LAB Ice Ball Mold, Jun. 25, 2015, www.amazon.com/III-LAB-Ice-Ball-Mold/dp/B00IXMY6ZC/ref=pd_sim_79_7?ie=UTF8&refRID=03M2X7BAEYJMOJS46TF, 7 pages.*

Liu, Kevin, "Finally, a Tool for Making Totally Clear Ice Spheres", Jul. 22, 2014, www.seriouseats.com/2014/07/ice-balls-for-cocktails-

(56) References Cited

OTHER PUBLICATIONS best-home-tool-wintersmiths-does-clear-ice-melt-slower.html, 6 pages.*

Rose, Brent, "How to Make the Perfect Ice Cube", Gizmodo, Sep. 21, 2012, 6 pages.* eBay, 4 pcs Ice Brick Mold Party Bar Tray Cube Round Sphere Ball Maker Mould Kitchen, Apr. 29, 2013, www.ebay.com/itm/ws/eBayISAPI.dll?ViewItem&item=171021535448, 4 pages.*

Crea, Joe, "Ice Spheres, King Cubes bring the cool to cocktails this party season: Holiday Gift Guide 2013", Nov. 26, 2013, Cleveland.com, blog.cleveland.com/dining_impact/print.html?entry=/2013/11/Ice_sphere_King_Cubes_bring_t.html, 3 pages.*

Pearson, Laura, "Three Artisanal ice molds to elevate your mixology game", Chicago Tribune, Dec. 23, 2014, www.chicagotribune.com/lifestyles/home/sc-cons-1225-savvy-shopper-ice-makers-20141218-story.html, 3 pages.*

Tovolo Sphere Ice Molds, set of 2, Apr. 29, 2013, www.amazon.com/Tovolo-Sphere-Ice-Molds-Set/dp/B007ACTN54, 6 pages.*

Tovolo Sphere Ice Molds, set of 2, Sur la Table, www.surlatable.com/product/PRO-958470/Tovolo-Sphere-Ice-Molds-Set-of-2, Apr. 29, 2013, 3 pages.*

Julie, Coolest-Gadgets, "Zoku Ice Sphere Molds—for Cocktail Perfection", Dec. 12, 2013, www.coolest-gadgets.com/2013/1212/zoku-ice-sphere-molds-cocktail-perfection/, 3 pages.*

"Zoku Ice Ball Mold: Cooler and Easier Way to Enjoy Craft Cocktails on the Rocks", May 1, 2014, www.prnewswire.com/news=releases/zoku-ice-ball-mold-cooler-and-easier-way-to-enjoy-craft-cocktails-on-the-rocks-257498801.html, 2 pages.*

Zoku Ice Ball Ice Sphere Mold, set of 2, www.amazon.com/Zoku-Ice-Ball-Sphere-Mold/dp-B00l4A48VU, Nov. 23, 2013, 6 pages. See p. 4 for earliest date in comments.*

"Color screen shot of the website advertising the Zoku Quick Ice Pop Maker" sold by Williams-Sonoma (see http://www.williams-sonoma.com/products/zoku-quick-pop-maker/, accessed May 16, 2014).

PCT/US2014/011785 Notification of Transmittal of the International Search Report and the Written Opinion of the International Searching Authority, or Declaration, Dated: Apr. 22, 2014, (12 pages).

PCT/US2014/047024 Notification of Transmittal of the International Search Report and the Written Opinion of the International Searching Authority, or Declaration, Dated: Sep. 24, 2014, (9 pages).

* cited by examiner

ICE MOLD

CROSS-REFERENCE TO RELATED APPLICATION

This application is a Section 111(a) application relating to and claiming the benefit of commonly owned, U.S. Provisional Application Ser. No. 61/847,731 filed on Jul. 18, 2013, the disclosure of which is incorporated by reference herein in its entirety.

FIELD OF THE INVENTION

The present invention relates to ice molds, and, more particularly, to ice molds for making frozen geometric shapes, such as ice spheres.

BACKGROUND OF THE INVENTION

Ice molds are used to freeze liquids in geometric, three-dimensional shapes, such as, for example, the shape of a sphere or a ball, for use with beverages, such as alcoholic drinks, frozen drinks, and the like. With conventional ice sphere molds, it is difficult to remove the frozen ice sphere from the mold as it sticks thereto. This results in a user having to inconveniently run water over the mold and/or the frozen sphere in order to facilitate removal of the sphere from the mold.

SUMMARY OF THE INVENTION

In an embodiment, an ice mold includes a first mold assembly including a base having a first end, a second end opposite the first end, and an aperture extending from the first end to the second end, and a first mold attached to the second end of the base, the first mold including a receptacle having a first surface, a second surface opposite the first surface, and a first cavity, and a second mold assembly including a base having a first end, a second end opposite the first end of the base of the second mold assembly, and an aperture extending from the first end of the base of the second mold assembly to the second end of the base of the second mold assembly, and a second mold attached to the second end of the base of the second mold assembly, the second mold including a receptacle having a first surface, a second surface opposite the first surface of the receptacle of the second mold, and a second cavity, the first mold assembly being attached removably to the second mold assembly wherein a liquid-tight seal is formed between the first mold and the second mold, wherein when the first mold assembly and the second mold assembly are attached to one another, the first cavity of the first mold and the second cavity of the second mold form a molding cavity, and wherein when the first mold assembly and the second mold assembly are detached from one another, the receptacle of the first mold is moveable from a first molding position, in which the receptacle of the first mold is positioned within the aperture of the base of the first mold assembly, and a second inverted position, in which at least a portion of the receptacle of the first mold extends outwardly from the aperture of the first base of the first mold assembly at the second end of the base of the first mold assembly.

In an embodiment, the base of the first mold assembly includes an annular flange extending from the second end of the base of the first mold assembly, and the base of the second mold assembly includes an annular flange extending from the second end of the base of the second mold assembly, wherein the receptacle of the first mold includes an annular portion and the receptacle of the second mold includes an annular flange, wherein the annular portion of the receptacle of the first mold is engaged removably with the annular flange of the base of the first mold assembly, and the annular flange of the receptacle of the second mold is engaged removably with the annular flange of the base of the second mold assembly. In an embodiment, the base of the first mold assembly includes an annular groove intermediate the annular flange of the base of the first mold assembly and the second end of the base of the first mold assembly, and the annular portion of the receptacle of the first mold includes a first annular flange portion having an internal groove, a first internal lip, and a second internal lip, and a second annular flange portion having an external annular groove and a surface portion, wherein the first internal lip engages the annular groove of the base of the first mold assembly and the annular flange of the base of the first mold assembly engages the internal groove of the first mold, and the second internal lip of the first annular flange portion engages the annular flange of the base of the first mold assembly. In an embodiment, the annular flange of the second mold includes a branch, an internal groove located on one side of the branch and defining an internal annular lip, and an internal annular bead located on an opposite side of the branch, wherein the internal annular lip of the second mold engages the annular groove of the base of the second mold assembly, and the annular flange of the base of the second mold assembly engages the internal groove of the second mold, and the branch of the second mold engages the second end of the base of the second mold assembly. In an embodiment, the internal annular bead of the second mold engages the external annular groove of the first mold to form a liquid-tight seal between the annular flange of the second mold and the second annular flange portion of the first mold. In an embodiment, the branch of the second mold and the surface portion of the first mold form a liquid-tight seal.

In an embodiment, the receptacle of the first mold is substantially semi-spherical in shape and the receptacle of the second mold is substantially semi-spherical in shape. In an embodiment, the molding cavity is spherical in shape. In an embodiment, the receptacle of the first mold and the receptacle of the second mold are each made from a flexible material. In an embodiment, the receptacle of the first mold and the receptacle of the second mold are each made from silicone rubber.

In an embodiment, when the first mold assembly and the second mold assembly are detached from one another, the receptacle of the second mold is moveable from a first molding position, in which the receptacle of the second mold is positioned within the aperture of the base of the second mold assembly, and a second inverted position, in which at least a portion of the receptacle of the second mold extends outwardly from the aperture of the base of the second mold assembly at the second end of the base of the second mold assembly.

In an embodiment, the base of the first mold assembly includes a wall extending from the first end of the base of the first mold assembly to the second end of the base of the first mold assembly, and the base of the second mold assembly includes a wall extending from the first end of the base of the second mold assembly to the second end of the base of the second mold assembly. In an embodiment, the wall of the base of the first mold assembly includes a first height, and the wall of the base of the second mold assembly includes a second height. In an embodiment, the receptacle of the first mold includes a first volume, and the receptacle of the second mold includes a second volume. In an embodiment, the first height is equal to the second height. In an embodiment, the first volume is equal to the second volume. In an embodiment, the first height is greater than the second height. In an embodiment, the first volume is greater than the second volume. In an embodiment, the first height is less than the second height. In an embodiment, the first volume is less than the second volume. In an embodiment, the wall of the base of the first mold assembly is substantially frusto-conical in shape. In an embodiment, the wall of the base of the second mold assembly is substantially frusto-conical in shape. In an embodiment, the base of the first mold assembly and the base of the second mold assembly are each made from plastic. In an embodiment, the base of the first mold assembly and the first mold are unitary. In an embodiment, the base of the second mold assembly and the second mold are unitary.

In an embodiment, the receptacle of the second mold includes a fill hole. In an embodiment, the molding cavity is adapted to be filled with a fluid through the fill hole.

BRIEF DESCRIPTION OF THE DRAWINGS

For a more complete understanding of the present invention, reference is made to the following detailed description of an exemplary embodiment considered in conjunction with the accompanying drawings, in which.

DETAILED DESCRIPTION OF THE DRAWINGS

Figure 1:
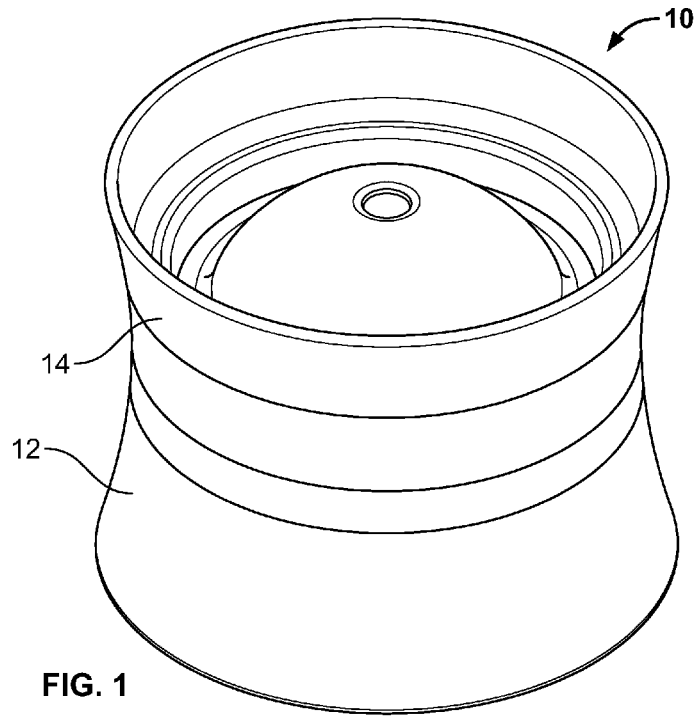
FIG. 1 is a top perspective view of an ice mold in accordance with an embodiment of the present invention.
Figure 2:
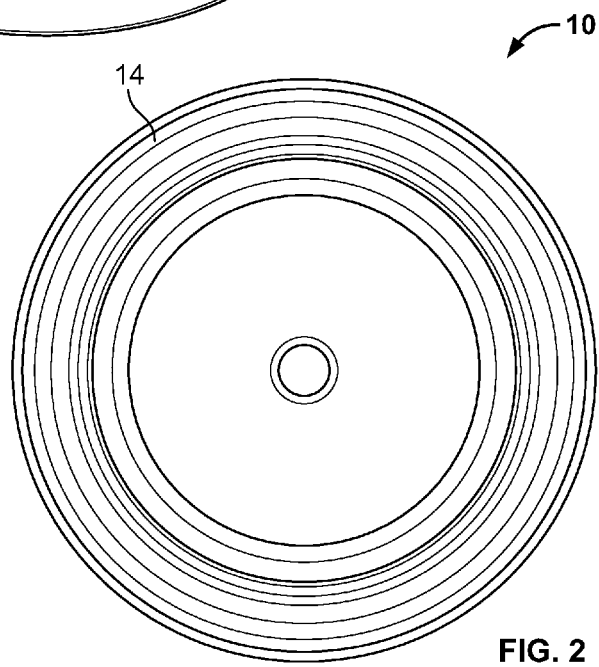
FIG. 2 is a top plan view of the ice mold shown in FIG. 1.
Figure 3:
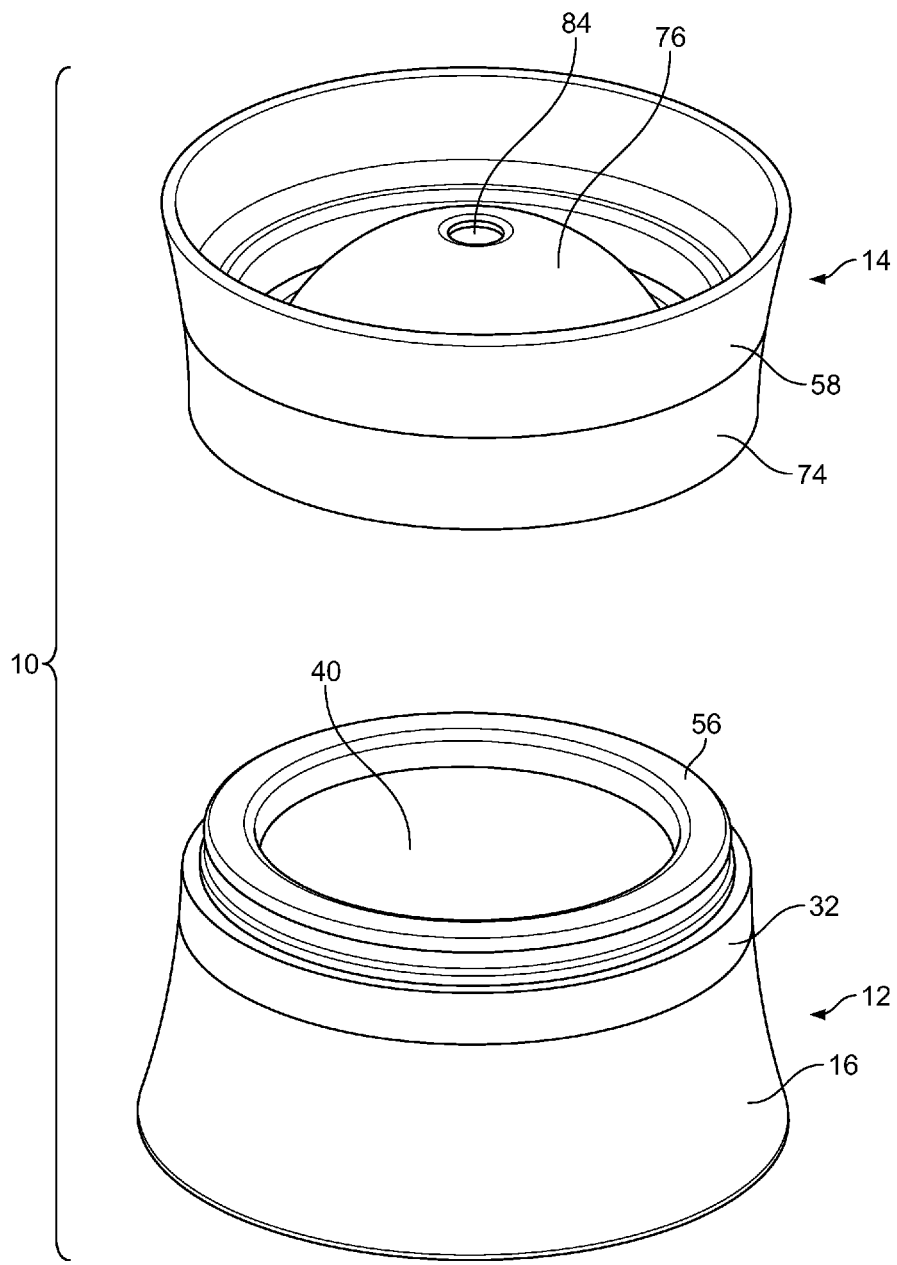
FIG. 3 is an exploded perspective view of the ice mold shown in FIG. 1.
Figure 4:
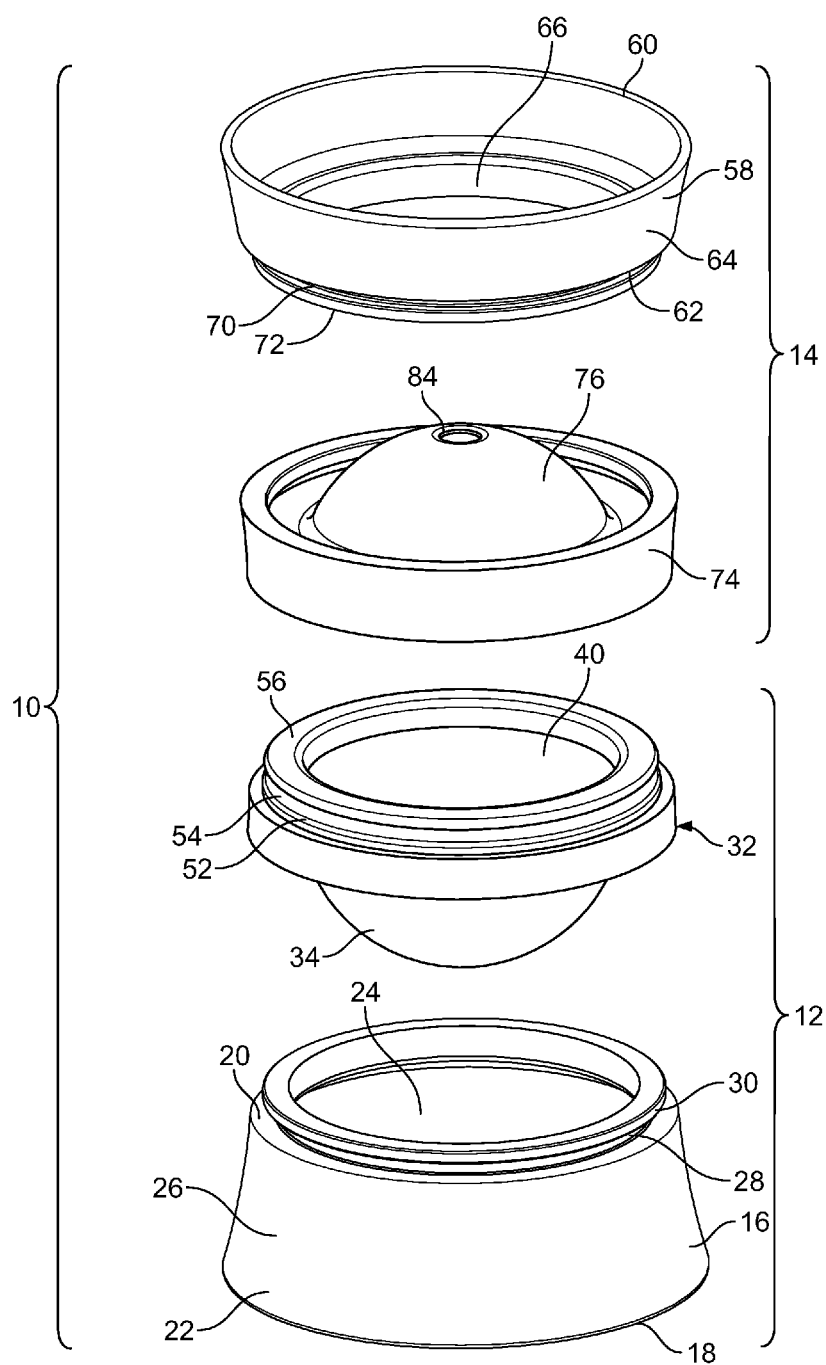
FIG. 4 is an exploded perspective view of the ice mold shown in FIG. 3, further depicting an exploded first mold assembly and a second mold assembly employed by the ice mold.
Figure 5:
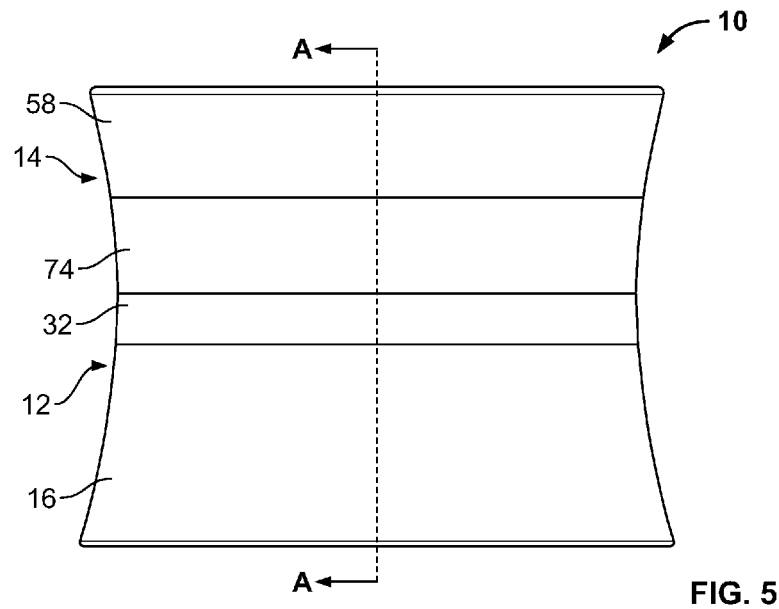
FIG. 5 is a side elevational view of the ice mold shown in FIG. 1.

Referring to FIGS. 1 through 4, an ice mold 10 includes a first mold assembly 12 and a second mold assembly 14 that is attached removably to the first mold assembly 12. Referring to FIGS. 3 through 6, in an embodiment, the first mold assembly 12 includes a base 16 having a first end 18, a second end 20 opposite the first end 18, a wall 22 extending from the first end 18 to the second end 20, and an aperture 24 that extends from the first end 18 to the second end 20. In an embodiment, each of the openings of the aperture 24 is circular in shape. In an embodiment, the wall 22 includes an exterior surface 26 which tapers and narrows in diameter from the first end 18 to the second end 20. In an embodiment, the wall 22 of the base 16 is substantially frusto-conical in shape. In another embodiment, the wall 26 of the base 16 is cylindrical in shape. In an embodiment, an annular flange or lip 30 extends from the second end 20 of the base 16, forming an annular groove 28 located proximate to the second end 20 of the base 16 and intermediate the annular flange 30 and the second end 20. In an embodiment, the base 16 is made from plastic. In other embodiments, the base 16 may be made from other materials known in the art. In an embodiment, the base 16 may be fabricated by compression molding, injection molding, or by other suitable methods.

With reference to FIGS. 3 through 6, in an embodiment, the first mold assembly 12 includes a first mold 32 that is attached removably to the second end 20 of the base 16. In another embodiment, the first mold 32 is unitary with the base 16. In an embodiment, the first mold 32 includes a substantially semi-spherical shaped, flexible receptacle 34 having a first surface 36 and a second surface 38 opposite the first surface 36, and which forms a cavity 40 defined by the first surface 36. In an embodiment, the first mold 32 includes an annular portion 42 that extends outwardly from and is unitary with one end of the receptacle 34. In an embodiment, the annular portion 42 includes a first annular flange portion 44 having an internal groove 46 that defines a first internal lip 48 and a second internal lip 50. In an embodiment, the annular portion 42 further includes a second annular flange portion 52 having an external annular groove 54 and a top surface portion 56 that surrounds the cavity 40 (see also, FIG. 3). In an embodiment, the first mold 32 is made of a flexible material, such as silicone rubber. In an embodiment, the silicone rubber has a durometer of about 40A. In other embodiments, other suitable materials and durometers may be utilized to construct the first mold 32.

Figure 6:
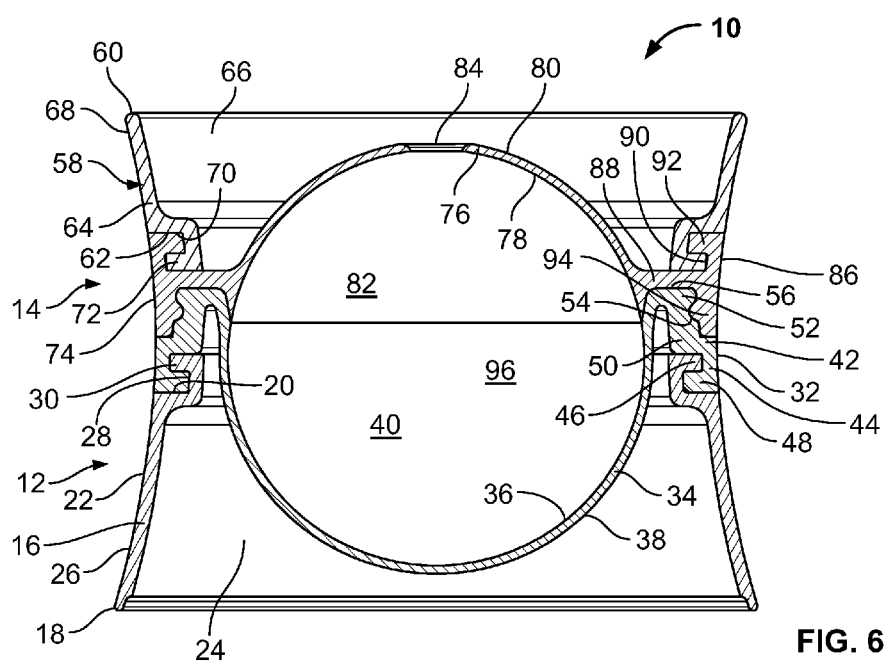
FIG. 6 is a cross-sectional view, taken along line A-A and looking in the direction of the arrows, of the ice mold shown in FIG. 5.

Referring to FIG. 6, the first mold 32 is attached removably to the second end 20 of the base 16 such that the first internal lip 48 of the first mold 32 engages the annular groove 28 of the base 16 and the annular lip 30 of the base 16 engages the internal groove 46 of the first mold 32, and the second internal lip 50 engages the annular lip 30 of the base 16. In an embodiment, the receptacle 34 of the first mold 32 is moveable from a first, molding position, in which the receptacle 34 is positioned within the aperture 24 of the base 16 and housed therein, and a second, inverted position, in which at least a portion of the receptacle 34 extends outwardly from the aperture 24 of the base 16 at the second end 20 thereof, and the first surface 36 of the receptacle 34 is exposed externally from the second end 20 of the base 16. The purpose and function of the inversion feature of the receptacle 34 will be discussed below.

Referring to FIGS. 3 through 6, in an embodiment, the second mold assembly 14 includes a base 58 having a first end 60, a second end 62 opposite the first end 60, a wall 64 extending from the first end 60 to the second end 62, and an aperture 66 that extends from the first end 60 to the second end 62. In an embodiment, each of the openings of the aperture 66 is circular in shape. In an embodiment, the wall 64 has an exterior surface 68, which tapers and narrows in diameter from the first end 60 to the second end 62. In an embodiment, the wall 64 of the base 58 is substantially frusto-conical in shape. In another embodiment, the wall 64 of the base 58 is cylindrical in shape. In an embodiment, an annular flange or lip 72 extends from the second end 62 of the base 58, forming an annular groove 70 located proximate to the second end 62 of the base 58. In an embodiment, the base 58 is made from plastic. In other embodiments, the base 58 may be made from other materials known in the art. In an embodiment, the base 58 may be fabricated by compression molding, injection molding, or by other suitable methods. In an embodiment, the height of the wall 64 of the base 58 of the second mold assembly 14 is smaller than the height of the wall 22 of the base 16 of the first mold assembly 12. In another embodiment, the height of the wall 64 of the base 58 of the second mold assembly 14 is greater than the height of the wall 22 of the base 16 of the first mold assembly 12. In an another embodiment, the height of the wall 64 of the base 58 of the second mold assembly 14 is equal to the height of the wall 22 of the base 16 of the first mold assembly 12.

With reference to FIG. 6, in an embodiment, the second mold assembly 14 includes a second mold 74 that is attached removably to the second end 62 of the base 58. In another embodiment, the first mold 74 is unitary with the base 58. In an embodiment, the second mold 74 includes a substantially semi-spherical shaped, flexible receptacle 76 having a first surface 78 and a second surface 80 opposite the first surface 78, and which forms a cavity 82 defined by the first surface 78. In an embodiment, the volume of the receptacle 76 of the second mold 74 is less than the volume of the receptacle 34 of the first mold 32. In another embodiment, the volume of the receptacle 76 of the second mold 74 is equal to the volume of the receptacle 34 of the first mold 32. In other embodiment, the volume of the receptacle 76 of the second mold 74 is greater than the volume of the receptacle 34 of the first mold 32.

In an embodiment, the receptacle 76 includes a fill hole 84 extending from the first surface 78 to the second surface 80 thereof and in communication with the cavity 82. In an embodiment, an annular flange 86 is integrated with one end of the receptacle 76 via an extending branch 88. In an embodiment, on one side of the branch 88, the annular flange 86 includes an internal groove 90 formed on an interior portion thereof and which defines an internal annular lip 92 and, on the other side of the branch 88, an internal annular bead 94 extending from the interior portion. In an embodiment, the second mold 74 is made of a flexible material, such as silicone rubber. In an embodiment, the silicone rubber has a durometer of about 40A. In other embodiments, other suitable materials and durometers may be utilized to construct the second mold 74.

With reference to FIG. 6, the second mold 74 is attached removably to the second end 62 of the base 58 such that the lip 92 of the second mold 74 engages the annular groove 70 of the base 58 and the annular lip 72 of the base 58 engages the internal groove 90 of the second mold 74, and the branch 88 engages the second end 62 of the base 58. In an embodiment, the receptacle 76 of the second mold 74 is moveable from a first, molding position, in which the receptacle 76 is positioned within the aperture 66 of the base 58 and housed therein, and a second, inverted position, in which at least a portion of the receptacle 76 extends outwardly from the aperture 66 of the base 58 at the second end 62 thereof, and the first surface 78 is exposed externally from the second end 62 of the base 58. The purpose and function of the inversion feature of the receptacle 76 will be discussed below.

In an embodiment, the first mold assembly 12 and the second mold assembly 14 are attached removably to one another, such that the first mold 32 and the second mold 74 connect removably with one another and form a liquid-tight seal therebetween. In this regard, in an embodiment, the bead 94 of the second mold 74 engages the external annular groove 54 of the first mold 32, thus forming a connection and a liquid-tight seal between the annular flange 86 of the second mold 74 and the second annular flange portion 52 of the first mold 32. In an embodiment, a seal is also formed between the branch 88 of the second mold 74 and the top surface portion 56 of the first mold 32. In an embodiment, when the first mold assembly 12 and the second mold assembly 14 are attached to one another, the cavity 40 of the first mold 32 and the cavity 82 of the second mold 74 form a spherical-shaped cavity 96 (see FIG. 6).

Figure 8:
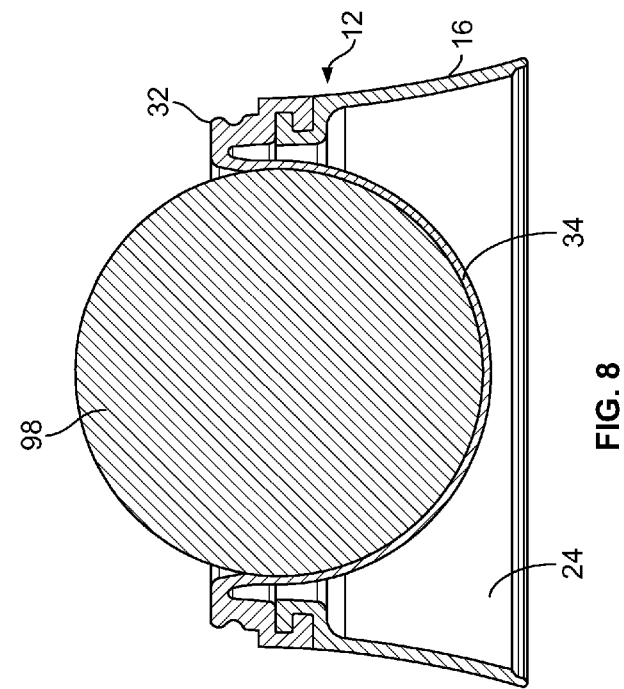
FIG. 8 is a side cross-sectional view of a first molding member employed by the ice mold shown in FIG. 7.
Figure 7:
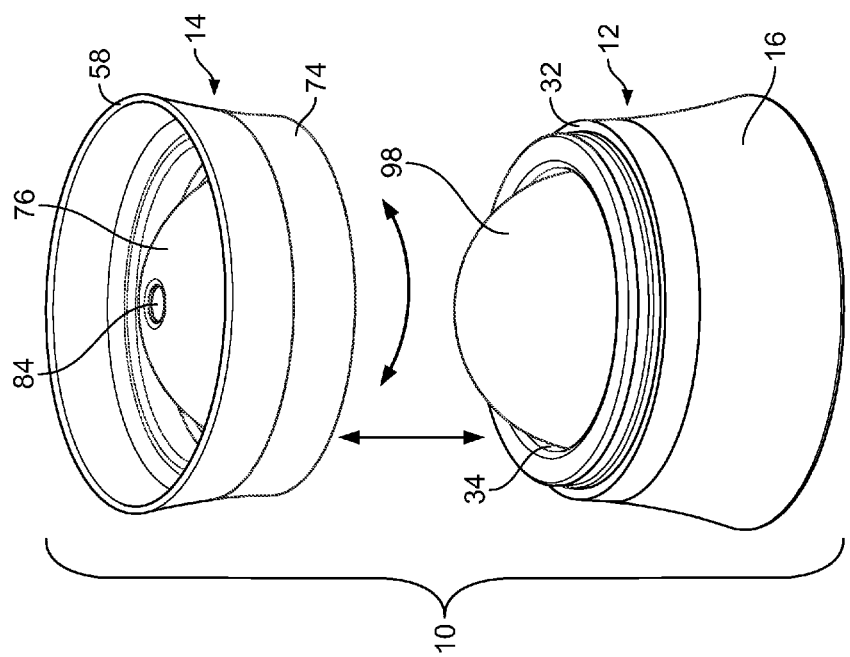
FIG. 7 is an exploded perspective view of the ice mold shown in FIG. 3 with an ice sphere contained therein.
Figure 10:
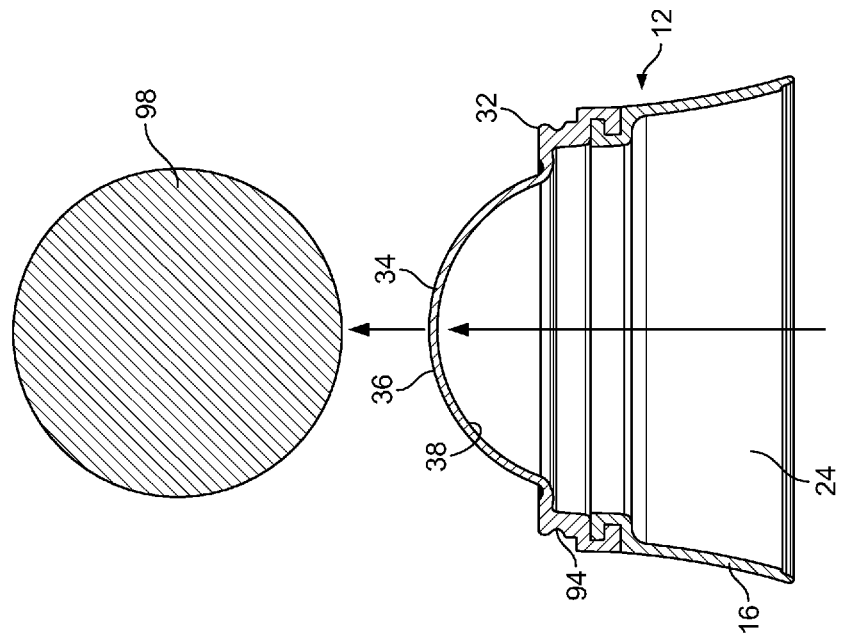
FIG. 10 is a side cross-sectional view of the first molding member and ice sphere shown in FIG. 9.
Figure 9:
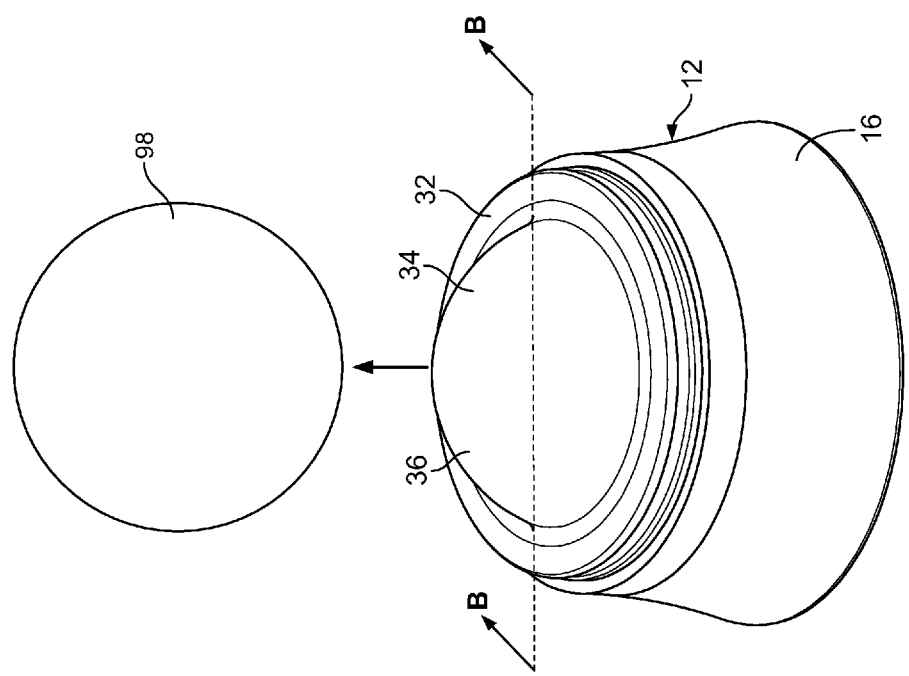
FIG. 9 is an exploded perspective view of the first molding member shown in FIG. 7 with the ice sphere being removed therefrom.

In an embodiment, the cavity 96 is adapted to be filled with a fluid to be frozen through the fill hole 84 of the second mold 74. In an embodiment, the fluid is water. In other embodiments, the fluid may be other consumable liquids, such as juices, sodas, or other beverages. In an embodiment, once the cavity 96 is filled, any excess liquid not entering the cavity 96 is collected within the underside of the second mold assembly 14 and can be disposed by turning over the mold 10. In an embodiment, the fill hole 84 is sized and shaped such that the liquid residing within the cavity 96 does not leak therefrom when the mold 10 is turned over, due to the surface tension of the liquid and the internal pressure thereof within the cavity 96. In an embodiment, once the cavity 96 is filled with the liquid, the mold 10 is placed within a freezer at a sufficiently cold temperature for a sufficient period of time to freeze the liquid. When the liquid is sufficiently frozen into an ice sphere 98, the second mold assembly 14 is detached from the first mold assembly 12 by pulling and/or twisting them apart, thereby releasing the connection between the bead 94 of the second mold 74 and the external annular groove 54 of the first mold 32. In an embodiment, when the second mold assembly 14 is detached from the first mold assembly 12, the ice sphere 98 resides within the receptacle 34 of the first mold 32, as shown in FIGS. 7 and 8. To facilitate removal of the ice sphere 98 from the first mold 32, a user may push on the second surface 38 of the receptacle 34 (which is accessible through the aperture 24 from the first end 18 of the base 16) in order to move the receptacle 34 from its first, molding position to its second, inverted position, thereby pushing out and releasing the ice sphere 98 from the first mold 32, as shown in FIGS. 9 and 10. Thus, the ice sphere 98 is removed from the mold 10 in an easy and convenient manner. For example, the first mold 32 does not have to be subjected to running water to loosen the ice sphere 98 therefrom. In an embodiment, once the ice sphere 98 is removed from the first mold 32, the receptacle 34 may be flexed back from its second, inverted position to its first, molding position. As indicated above, the first mold 32 may be removed from the base 16, and the second mold 74 may be removed from the base 58, to facilitate cleaning of such components.

It should be understood that when the second mold assembly 14 is detached from the first mold assembly 12, the ice sphere 98 may happen to reside within the receptacle of 76 of the second mold 74 (not shown in the Figures). In this situation, to facilitate removal of the ice sphere 98 from the second mold 74, a user may push on the second surface 80 of the receptacle 76 (which is accessible through the aperture 66 from the first end 60 of the base 58) in order to move the receptacle 76 from its first, molding position to its second, inverted position, thereby releasing the ice sphere 98 from the second mold 74 (not shown in the Figures) without the need to subject it to running water or the user having to touch or grasp the ice sphere 98 itself. In an embodiment, once the ice sphere 98 is removed from the second mold 74, the receptacle 76 may be flexed back from its second, inverted position to its first, molding position.

It will be understood that the embodiment described herein is one embodiment, and that a person skilled in the art may make many variations and modifications without departing from the spirit and scope of the invention. In an embodiment, the surfaces 36, 78 of the receptacles 34, 76 may be smooth. In other embodiments, the surfaces 36, 78 of the receptacles 34, 76 may be patterned to form different shapes (e.g., soccer balls, basketballs, globes, planets, etc.). In other embodiments, the receptacles 34, 76 may consist of different shapes and sizes (e.g., egg-shaped, etc.). All such variations and modifications, in addition to those described above, are intended to be included within the scope of the claims.

What is claimed is:

1. An ice mold, comprising:
a first mold assembly including a base having a first end, a second end opposite said first end, and an aperture extending from said first end to said second end, and a first mold attached to said second end of said base, said first mold including a receptacle having a first surface, a second surface opposite said first surface, and a first cavity; and
a second mold assembly including a base having a first end, a second end opposite said first end of said base of said second mold assembly, and an aperture extending from said first end of said base of said second mold assembly to said second end of said base of said second mold assembly, and a second mold attached to said second end of said base of said second mold assembly, said second mold including a receptacle having a first surface, a second surface opposite said first surface of said receptacle of said second mold, and a second cavity, said first mold assembly being attached removably to said second mold assembly wherein a liquid-tight seal is formed between said first mold and said second mold,
wherein said base of said first mold assembly includes an annular flange extending from said second end of said base of said first mold assembly, and said base of said second mold assembly includes an annular flange extending from said second end of said base of said second mold assembly, wherein said receptacle of said first mold includes an annular portion and said receptacle of said second mold includes an annular flange, wherein said annular portion of said receptacle of said first mold is engaged removably with said annular flange of said base of said first mold assembly, and said annular flange of said receptacle of said second mold is engaged removably with said annular flange of said base of said second mold assembly,
wherein said base of said first mold assembly includes an annular groove intermediate said annular flange of said base of said first mold assembly and said second end of said base of said first mold assembly, and said annular portion of said receptacle of said first mold includes a first annular flange portion having an internal groove, a first internal lip, and a second internal lip, and a second annular flange portion having an external annular groove and a surface portion, wherein said first internal lip engages said annular groove of said base of said first mold assembly and said annular flange of said base of said first mold assembly engages said internal groove of said first mold, and said second internal lip of said first annular flange portion engages said annular flange of said base of said first mold assembly,
wherein said annular flange of said second mold includes a branch, an internal groove located on one side of said branch and defining an internal annular lip, and an internal annular bead located on an opposite side of said branch, wherein said internal annular lip of said second mold engages said annular groove of said base of said second mold assembly, and said annular flange of said base of said second mold assembly engages said internal groove of said second mold, and said branch of said second mold engages said second end of said base of said second mold assembly,
wherein when said first mold assembly and said second mold assembly are attached to one another, said first cavity of said first mold and said second cavity of said second mold form a molding cavity, and
wherein when said first mold assembly and said second mold assembly are detached from one another, said receptacle of said first mold is moveable from a first molding position, in which said receptacle of said first mold is positioned within said aperture of said base of said first mold assembly, and a second inverted position, in which at least a portion of said receptacle of said first mold extends outwardly from said aperture of said first base of said first mold assembly at said second end of said base of said first mold assembly, and
wherein when said first mold assembly and said second mold assembly are detached from one another, said receptacle of said second mold is moveable from a first molding position, in which said receptacle of said second mold is positioned within said aperture of said base of said second mold assembly, and a second inverted position, in which at least a portion of said receptacle of said second mold extends outwardly from said aperture of said base of said second mold assembly at said second end of said base of said second mold assembly.

2. The ice mold of claim 1, wherein said internal annular bead of said second mold engages said external annular groove of said first mold to form a liquid-tight seal between said annular flange of said second mold and said second annular flange portion of said first mold.

3. The ice mold of claim 2, wherein said branch of said second mold and said surface portion of said first mold form a liquid-tight seal.

4. The ice mold of claim 3, wherein said receptacle of said first mold is substantially semi-spherical in shape and said receptacle of said second mold is substantially semi-spherical in shape.

5. The ice mold of claim 4, wherein said molding cavity is spherical in shape.

6. The ice mold of claim 5, wherein said receptacle of said first mold and said receptacle of said second mold are each made from a flexible material.

7. The ice mold of claim 6, wherein said receptacle of said first mold and said receptacle of said second mold are each made from silicone rubber.

8. The ice mold of claim 1, wherein said base of said first mold assembly includes a wall extending from said first end of said base of said first mold assembly to said second end of said base of said first mold assembly, and said base of said second mold assembly includes a wall extending from said first end of said base of said second mold assembly to said second end of said base of said second mold assembly.

9. The ice mold of claim 8, wherein said wall of said base of said first mold assembly includes a first height, and said wall of said base of said second mold assembly includes a second height.

10. The ice mold of claim 9, wherein said receptacle of said first mold includes a first volume, and said receptacle of said second mold includes a second volume.

11. The ice mold of claim 10, wherein said first height is equal to said second height.

12. The ice mold of claim 11, wherein said first volume is equal to said second volume.

13. The ice mold of claim 10, wherein said first height is greater than said second height.

14. The ice mold of claim 13, wherein said first volume is greater than said second volume.

15. The ice mold of claim 10, wherein said first height is less than said second height.

16. The ice mold of claim 15, wherein said first volume is less than said second volume.

17. The ice mold of claim 8, wherein said wall of said base of said first mold assembly is substantially frusto-conical in shape.

18. The ice mold of claim 17, wherein said wall of said base of said second mold assembly is substantially frusto-conical in shape.

19. The ice mold of claim 8, wherein said base of said first mold assembly and said base of said second mold assembly are each made from plastic.

20. The ice mold of claim 1, wherein said base of said first mold assembly and said first mold are unitary.

21. The ice mold of claim 20, wherein said base of said second mold assembly and said second mold are unitary.

22. The ice mold of claim 1, wherein said receptacle of said second mold includes a fill hole.

23. The ice mold of claim 22, wherein said molding cavity is adapted to be filled with a fluid through said fill hole.

* * * * *